3,280,006
PROCESS FOR PRODUCING DEXTROSE SOLUTIONS

Thomas L. Hurst and Almerin W. Turner, Decatur, Ill., assignors to A. E. Staley Manufacturing Company, Decatur, Ill., a corporation of Delaware
No Drawing. Filed Nov. 22, 1963, Ser. No. 325,768
4 Claims. (Cl. 195—31)

Our invention relates to the production of dextrose. More particularly, our invention relates to an improved method for producing dextrose by enzymatic hydrolysis of starch.

Dextrose is commercially manufactured by saccharifying an acid-thinned aqueous starch suspension with the dextrose - producing enzyme amyloglucosidase. This process has enabled the production of dextrose solutions containing up to about 93% by weight of dextrose based on the dry substance in the solution. Recently, it has been reported, dextrose solutions containing on the order of 98% dextrose may be obtained by thinning the starch with the enzyme alpha amylase followed by amyloglucosidas conversion. In spite of this advantage, certain drawbacks have limited the use of alpha amylase-thinned starch suspensions in the manufacture of dextrose. Among these drawbacks is the difficulty encountered in economically filtering the final dextrose solution. This filtration step is necessary for the removal of impurities in all dextrose producing processes. While not being limited to any particular theory, it is believed that the difficulty encountered in filtering dextrose solutions produced from starch thinned by alpha amylase is caused by incomplete liquefaction or thinning of the starch dry substance before it is subjected to the action of amyloglucosidase. Liquefaction of starch by alpha amylase is described by Kerr, Chemistry and Industry of Starch, Academic Press, 1950, pp. 444–446. Another major drawback which accompanies the filtration problem is that the unliquefied or "insoluble" starch is lost to the dextrose process. This starch loss further reduces the attractiveness of producing dextrose from alpha amylase thinned starch despite the higher dextrose content that can be obtained.

An important object of our invention is the provision of an improved method for producing dextrose solutions by the saccharification of enzyme-thinned starch which can be easily and economically filtered.

A further object of our invention is the provision of an improved process for producing dextrose solutions by the saccharification of enzyme-thinned starch whereby the loss of starch due to insolubilized starch is greatly reduced.

A still further object of our invention is the provision of an improved process for producing dextrose solutions containing low amounts of higher sugars.

The literature contains many publications which are concerned with producing dextrose solutions by thinning starch with alpha amylase followed by saccharification of the thinned starch with amyloglucosidase. In this process an aqueous starch suspension containing up to about 45% starch dry substance is typically thinned and partially hydrolyzed in the presence of alpha amylase at from about 65–85° C. at a pH of about 5–7 over a period of from about 1 to 24 hours. For the thinning of starch the commercially available alpha amylase obtained from *Bacillus subtilis* is most commony employed. However, alpha amylase from other suitable sources, such as fungi barley malt and pancreas, may also be utilized. In the process, trace amounts of calcium ions may be incorporated in the aqueous starch suspension as an aid in activating and stabilizing the alpha amylase. After thinning, the partially hydrolyzed starch is hydrolyzed to dextrose by the action of amyloglucosidase, typically in about 36–90 hours at a temperature of from about 40–70° C. and a pH of about 3–6. The enzyme amyloglucosidase is obtainable from each of a number of different microorganisms, particularly of the Aspergillus, Clostridium, Mucor and Rhizopus genera in accordance with known methods. The amyloglucosidase is characterized by its ability to hydrolyze thinned starch to dextrose with the concurrent formation of only inconsequential amounts of higher sugars. In order to insure optimum effectiveness of the enzyme it is preferable to utilize amyloglucosidase preparations which are substantially free of interfering enzymes, especially transglucosylase. Interfering enzymes may be removed from amyloglucosidase preparations by any suitable refining method. Typical refining methods are disclosed in U.S. Patent Nos. 2,967,804; 2,970,086; 3,067,108 and 3,017,330.

The amounts of enzymes based on starting starch material are not critical in the dextrose process. Higher amounts naturally shorten the time required to produce the dextrose, while, on the other hand, higher amounts increase the material cost of the process.

Because of its abundance and low cost, unmodified corn starch is commonly used in producing dextrose. However, other starches, such as those derived from wheat, potatoes, rice, and tapioca, may also be employed.

It has been found, in accordance with the present invention, that a number of unexpected improvements and advantages are obtained in the production of dextrose by following a specific heating schedule after the starch has been thinned by alpha amylase, but before it is subjected to the action of amyloglucosidase. Briefly stated, our invention comprises heating the thinned and partially hydrolyzed aqueous starch suspension containing the alpha amylase to from about 90–100° C. for a period of time to liquefy substantially all of the starch and then heating the suspension to at least 125° C. under pressure.

In order to insure economical operation of our improved process, it is necessary that the thinned starch suspension be sufficiently liquefied before it is heated to 90–100° C. If insufficient liquefaction has taken place before the thinned suspension is heated to 90° C. the suspension becomes excessively viscous, and the economical operation of our improved process is hampered. The heat transfer of an excessively viscous starch suspension which has not been sufficiently liquefied is inefficient. "Hot spots" are developed in the suspension and the activity of the alpha amylase is greatly reduced by inactivation of the enzyme. In the absence of sufficient liquefaction, it is necessary to add additional amounts of enzyme in order to complete the liquefaction within the temperature range of 90–100° C. It is desirable, therefore, in order to avoid additional use of expensive enzyme, to liquefy as much of the starch as is economically possible, considering the time and amount of enzyme, before heating the suspension to 90° C. Naturally, it is recognized that the viscosity is primarily dependent on the amount of unliquefied starch in the thinned aqueous suspension.

It has been found that in order to insure economical operation of our process, it is necessary to reduce the viscosity of the thinned suspension to less than 100 centipoises when measured at 80° C. and 25% solids before the suspension is heated to 90° C. or above. It is preferable to reduce the viscosity of the thinned aqueous starch suspension to less than 100 centipoises before heating to 90° C. or above. The time required for sufficient liquefaction at temperatures below 90° C., of course, will depend on the dry substance content of the aqueous starch suspension and the amount and potency of the alpha amylase preparation utilized. Typically, when economical amounts of alpha amylase are utilized, sufficient liquefaction of starch suspensions containing from about 20–45% starch dry substance is obtained at temperatures below 90° C. in from 1–8 hours, the particular time depending on the amount and potency of the enzyme, the amount of starch, the temperature, the pH and the equipment utilized.

The amount of time the partially liquefied starch suspension is maintained between 90–100° C. will depend on many factors, including the degree of liquefaction of the starch suspension and the amount and/or potency of the alpha amylase utilized. In all cases it is necessary to maintain the suspension within the temperature range until substantially all of the starch is liquefied. Typically, this is accomplished in about ½ to 3 hours. Within the stated temperature range best results are most easily obtained at from 90–96° C.

After liquefaction of substantially all of the starch the liquid material is heated under pressure to at least 125° C. The temperature above 125° C. and the time at the temperature should be regulated to avoid excessive coloration caused by degradation of the carbohydrates. The higher the temperature and the longer the holding time, the greater is the tendency for coloration to occur. The avoidance of excessive color is desirable since it is difficult and expensive to decolorize the final dextrose solution. We have established that for our purposes excessive coloration of the dextrose solution has occurred when the light transmittance of the final dextrose solution when measured at a solids content of about 30% is less than 30% at a wave length of 425 millimicrons. The percent transmittance is measured by setting the spectrophotometer at 100% transmittance at a wave length of 520 millimicrons and then adjusting the wave length to 425 millimicrons. By the same measurement, the percent transmittance of water is 54%. It is preferable that the light transmittance of the dextrose solutions be in excess of 50%. As a balance between avoidance of excessive color on the one hand, and improved filterability and reduced loss of insoluble starch on the other, temperatures of between 140–180° C. and holding times within the temperature range of from ½ to 5 minutes produce superior results. No minimum holding time, however, is required for the operation of our process since improved results are obtained when the liquid is merely brought to a temperature above 125° C. It has been observed, however, that in order to suppress color development it is generally undesirable to exceed a holding time at temperatures above 125° C. of 30 minutes. Because of increased danger of substantial degradation of the carbohydrates and also because expensive equipment must be used at high temperatures, it is advisable to avoid temperatures in excess of 200° C.

Any equipment suitable for heating starch solutions under pressure may be used for attaining the temperatures above 125° C. and the holding times at the temperature necessary for the operation of our process. For example, an autoclave can be employed, or the liquid can be pumped through a heat exchanger which comprises a coil of tubing in a constant temperature environment. The pressurized heating equipment may be equipped with a detention vessel to maintain the liquid at a selectable temperature for a suitable amount of time.

Another type of apparatus which may be employed for the pressurized heating step of our process is the type disclosed in U.S. Patent 3,101,284. In this apparatus, steam at superatmospheric pressure is continuously mixed with the liquid in the throat of a steam jet. By this method the desired temperature is quickly attained. In the apparatus described in the patent the steamheated liquid flows downward into and through a detention zone where the hot liquid is maintained at an elevated temperature for a period of time that is selectable. This apparatus is constructed and arranged so there is substantially no mixing in the detention zone in order that the liquid withdrawn from the bottom of the detention zone is maintained at a uniform temperature for a uniform length of time.

Other apparatus and methods for heating liquids under pressure which may be employed in our process are disclosed in U.S. Patent Nos. 2,582,198; 2,805,966; 2,871,146; 2,678,276 and 2,940,876.

The following examples illustrate the method of our invention but they are not intended as a limitation of the invention.

*Example 1*

This example illustrates a typical preparation of dextrose by our improved process.

A slurry of corn starch in water was prepared by mixing in a stainless steel vessel 1943 grams of the starch (1750 grams starch dry substance) with 3000 milliliters water. To the resulting slurry was then added 0.35 gram CaHPO$_4$. The pH of the slurry was then adjusted to 5.8 with sodium carbonate. To the slurry was then added 0.875 gram of alpha amylase produced by the organism *Bacillus subtilis*. The slurry was then placed in a water bath and heated for one hour and 46 minutes at the following temperatures:

| | Minutes |
|---|---|
| 65–70° C. | 30 |
| 75–80° C. | 12 |
| 80–88° C. | 42 |
| 90–95° C. | 42 |

Throughout the heating procedure, the slurry was continuously stirred. The pH of the resulting liquid was then adjusted to 3.7 with phosphoric acid. A 500-milliliter portion of the liquid containing 134 grams dry substance was heated to 150° C. by means of an apparatus of the type described in U.S. Patent 3,101,284 and maintained at that temperature for 10 minutes. At the end of the 10-minute period, the liquid was withdrawn from the heating apparatus and allowed to cool at room temperature to 60° C. To the cooled liquid was then added 5.4 ml. of refined amyloglucosidase containing 1340 units of amyloglucosidase. The liquid was then maintained at about 60° C. for 72 hours to obtain a dextrose solution containing 95.2% dextrose, dry substance basis. At the end of the 72 hours, the resulting dextrose solution was filtered through a 9-centimeter Whatman No. 2 filter paper in a Buchner funnel by suction of a water aspirator. The liquid filtered at a rate of 22 gal./sq. ft./hour, the temperature of the liquid being 60° C. The insoluble material deposited on the filter paper weighed 3.06 grams which is 2.3% of the total starch dry substance filtered.

A unit of amyloglucosidase referred to in this and the following examples is taken as that amount of enzyme required to digest one-tenth gram of starch essentially to dextrose in 48 hours at a pH of 4.0 and at a temperature of 55° C.

*Example 2*

This example illustrates the preparation of dextrose wherein the heating step in the range of 90–100° C. is omitted.

A slurry of corn starch in water was prepared in a stainless steel beaker by mixing 1727 grams of the starch (1560 grams dry substance) in 3200 ml. of water. To the slurry was added 0.86 grams CaHPO$_4$ and 0.52 grams alpha amylase produced by the organism *Bacillus subtilis*. The pH of the slurry was then adjusted to 5.7 with sodium carbonate. The slurry was then heated for 2 hours and 12 minutes at the following temperatures:

| | Minutes |
|---|---|
| 65–70° C. | 30 |
| 75–80° C. | 72 |
| 80–88° C. | 30 |

Throughout the heating procedure the slurry was continuously stirred. The pH of the resulting liquid was adjusted to 4.0 with phosphoric acid. A 1260-gram portion of the liquid containing 426 grams dry substance was heated to 150° C. utilizing the apparatus described in U.S. Patent 3,101,284 and maintained at that temperature for 10 minutes. At the end of the 10-minute period the liquid was withdrawn from the heating apparatus and allowed to cool to 60° C. 1.98 ml. of refined amyloglucosidase containing 713 units of amyloglucosidase were added to 250 ml. of the liquid, (71.3 grams dry substance) and the liquid containing the amyloglucosidase was maintained at 60° C. for 72 hours. At the end of the 72-hour period, a dextrose solution containing 93.2% dextrose based on the total sugar dry substance was obtained. The dextrose solution was then filtered following the procedure of Example 1. The dextrose solution filtered at a rate of 8.3 gal./sq. ft./hour, the temperature of the solution being 60° C. The insoluble material deposited on the filter paper weighed 5.11 grams (7.2% of the starting starch dry substance). A comparison of the results of Example 1 with the results of Example 2 shows the superiority of our process in obtaining an easily filterable dextrose solution having a low percentage of insoluble material. It is shown by utilizing the heating step in the range of 90–100° C. in combination with the heating step above 125° C. the filtration rate is increased nearly 300% and the percent insolubles is lowered nearly 300%.

*Example 3*

The following example is given to show the effects of temperatures above 125° C. and holding times at those temperatures on the filtration rate, the percent insolubles and the color of dextrose solutions produced according to our improved process.

A slurry of corn starch in water was prepared by mixing in a stainless steel vessel 2665 grams of starch (2380 grams starch dry substance) in 3800 ml. of water. To the resulting slurry was then added 0.476 gram of CaHPO$_4$. The pH of the slurry was then adjusted to 6.1 with sodium carbonate. To the slurry was added 1.99 grams of alpha amylase produced by the organism *Bacillus subtilis*. The slurry was then heated in a water bath for 4 hours and 20 minutes at the following temperatures:

| | Minutes |
|---|---|
| 60–70° C. | 40 |
| 70–75° C. | 30 |
| 75–80° C. | 30 |
| 80–88° C. | 90 |
| 90–96° C. | 50 |

The pH of the resulting liquid was then adjusted to 4.0 with phosphoric acid. 2700 ml. of the resulting liquid was divided into nine 300-ml. samples, each sample containing 71 grams of dry substance. Each 300-ml. sample was then heated to above 125° C. utilizing an apparatus of the type referred to in Examples 1 and 2. The temperature and holding time for each sample are given in Table I. At the end of the heating period each sample was withdrawn from the heating apparatus and allowed to cool to 60° C. To each sample was then added 4.76 ml. of refined amyloglucosidase containing 1638 units of amyloglucosidase and each sample was maintained at 60° C. for 72 hours. The samples were then separately filtered following the procedure of Examples 1 and 2. The filtration rate, the percent insolubles based on the starch dry substance and light transmittance of each sample measured at a wave length of 425 millimicrons are given in Table I. The light transmittance was measured in the Bausch and Lomb spectrophotometer by setting the light transmittance at 100% at 520 millimicrons and adjusting the wave length to 425 millimicrons to obtain the reading.

TABLE I

| Sample | Temperature, ° C. | Holding Time in Minutes | Filtration Rate, gal./sq. ft./hr. | Percent Insolubles D.S.B. | Percent Light Transmittance at 425 Millimicrons |
|---|---|---|---|---|---|
| 1 | 165 | 1 | 10.0 | 2.2 | 48 |
| 1 | 165 | 3 | 11.9 | 2.0 | 45 |
| 3 | 165 | 5 | 17.0 | 1.9 | 41 |
| 4 | 156 | 1 | 7.6 | 2.1 | 48 |
| 5 | 156 | 3 | 13.2 | 2.1 | 48 |
| 6 | 156 | 5 | 17.7 | 2.0 | 47 |
| 7 | 141 | 3 | 9.6 | 2.4 | 51 |
| 8 | 141 | 5 | 11.7 | 2.4 | 50 |
| 9 | 141 | 15 | 13.0 | 2.1 | 47 |

The data in Table I show that increased holding times at a given temperature lower the percent insolubles, increase the filtration rate and increase the color (decrease transmittance) of dextrose solutions prepared by our process. The data also show that higher temperatures at a given holding time produce like results.

*Example 4*

The following example is given to further show the effects of holding times on the dextrose solutions.

The general procedure of Example 3 was repeated with the exception that the holding times were 20 seconds and 10 minutes at a temperature of 165° C. The results are given in Table 2.

TABLE 2

| Sample | Holding Time in Minutes | Filtration Rate, gal./sq. ft./hr. | Percent Insoluble D.S.B. | Percent Light Transmission |
|---|---|---|---|---|
| 1 | ⅓ | 14.7 | 2.8 | 50 |
| 2 | 10 | 17.4 | 1.6 | 34 |

It is to be understood that the above described embodiments of our invention are for the purpose of illustrating only and our invention is limited only by the claims which follow.

Now, having described our invention, what we claim is:

1. In the process for the production of dextrose solutions by the enzymatic hydrolysis of starch wherein an aqueous starch suspension is partially hydrolyzed by the action of alpha amylase, the hydrolysis is completed by the action of amyloglucosidase and the hydrolyzed product is filtered, the improvement which comprises heating the partial hydrolyzate to from about 90 to about 100° C. for a period of time sufficient to liquefy substantially all of the starch, and then heating the resulting liquid to at least 125° C. under pressure, the temperature and the time at the temperature above 125° C. being limited to avoid excessive color development of the final dextrose solution, said improvement being effective to improve the filtration rate and to lower the amount of insoluble material in the dextrose solution.

2. In the process for the production of dextrose solutions by the enzymatic hydrolysis of starch wherein an aqueous starch suspension is partially hydrolyzed by the action of alpha amylase, the hydrolysis is completed by the action of amyloglucosidase and the hydrolyzed product is filtered, the improvement which comprises partially hydrolyzing the starch suspension to a viscosity of less than 1000 centipoises when measured at 80° C. and 25% solids, heating the partial hydrolyzate to from about 90 to about 100° C. for a period of time sufficient to liquefy substantially all of the starch, heating the resulting liquid to from 125° to 200° C. under pressure, the time at the temperature being limited to avoid excessive color development of the final dextrose solution, said improvement being effective to improve the filtration rate and to lower the amount of insoluble material in the dextrose solution.

3. The process of claim 2, wherein the holding time at between 125 and 200° C. does not exceed 30 minutes.

4. The process of claim 2 wherein the temperature above 125° C. is in the range from 140 to 180° C. and the holding time at the temperature is in the range from ½ to 5 minutes.

References Cited by the Examiner

UNITED STATES PATENTS

| | | | |
|---|---|---|---|
| 2,531,999 | 11/1950 | Wallerstein | 195—11 |
| 3,039,935 | 6/1962 | Rentshler et al. | 195—11 |
| 3,137,639 | 6/1964 | Hurst et al. | 195—31 |
| 3,149,049 | 9/1964 | Walkup et al. | 195—31 |

A. LOUIS MONACELL, *Primary Examiner.*

ALVIN E. TANENHOLTZ, *Examiner.*

UNITED STATES PATENT OFFICE
CERTIFICATE OF CORRECTION

Patent No. 3,280,006                                                   October 18, 1966

Thomas L. Hurst et al.

It is hereby certified that error appears in the above numbered patent requiring correction and that the said Letters Patent should read as corrected below.

Column 1, lines 22 and 23, for "amyloglucosidas" read -- amyloglucosidase --; column 2, line 1, for "commony" read -- commonly --; column 3, line 3, for "100" read -- 1000 --; line 50, for "50%" read -- 40% --; column 6, in the TABLE 1, first column, line 2 thereof, for "1" read -- 2 --.

Signed and sealed this 28th day of November 1967.

(SEAL)
Attest:

Edward M. Fletcher, Jr.                                                      EDWARD J. BRENNER Attesting Officer                                                             Commissioner of Patents